United States Patent [19]

Watanabe et al.

[11] Patent Number: 5,044,701
[45] Date of Patent: Sep. 3, 1991

[54] ELASTIC BODY APPARATUS ESPECIALLY INTENDED FOR AN ANTI-LOCK BRAKE SYSTEM

[75] Inventors: Mamoru Watanabe, Kawaguchi; Yasuhiro Miyama, Hunabashi, both of Japan

[73] Assignee: Miyako Jidosha Kogyo Kabushikigaisha, Tokyo, Japan

[21] Appl. No.: 507,153

[22] Filed: Apr. 10, 1990

[30] Foreign Application Priority Data

Apr. 14, 1989 [JP] Japan .................. 1-94650

[51] Int. Cl.$^5$ .............................. B60T 8/32
[52] U.S. Cl. ..................... 303/115; 92/134; 251/63.5; 251/68; 267/64.11; 267/64.27; 303/119
[58] Field of Search ............ 303/115, 113, 80, 85, 303/119; 251/61.2, 61.3, 68, 63, 63.5; 138/30; 267/64.11, 259, 64, 27, 35, 122; 280/714, 708-713; 188/181 A

[56] References Cited

U.S. PATENT DOCUMENTS

| | | | |
|---|---|---|---|
| 1,467,986 | 9/1923 | Van Der Pyl | 267/64.27 |
| 2,479,454 | 8/1949 | Annin | 92/134 X |
| 2,578,730 | 12/1951 | Nicholson et al. | 267/64.27 X |
| 3,431,031 | 3/1969 | Ike | 92/134 X |
| 3,509,795 | 5/1970 | Woodward | 92/134 X |
| 3,593,748 | 7/1971 | Teerling | 267/64.27 X |
| 3,802,686 | 4/1974 | Moulton | 267/64.27 |
| 4,600,245 | 7/1986 | Watanabe | |
| 4,759,260 | 7/1988 | Lew | 92/134 X |
| 4,880,213 | 11/1989 | Shinbori et al. | 267/64.27 |

FOREIGN PATENT DOCUMENTS 1256966 7/1989 Canada .

Primary Examiner—Douglas C. Butler
Attorney, Agent, or Firm—Collard, Roe & Galgano

[57] ABSTRACT

An elastic body apparatus includes a pneumatic pressure sealing member formed of a hollow flexible material and sealing therein a high pressure pneumatic gas, a movable member driven by an external force against the pressure of the pneumatic pressure sealing member, a fixed shell enveloping a fixed portion of the pneumatic pressure sealing member, and an elastic shell having plate spring portions for applying a spring force in the same direction as the pressing direction of the pneumatic pressure sealing member to the movable member, and disposed at a position enveloping a displacing portion of the pneumatic pressure sealing member. The elastic shell serves as a shell and a spring body, and even if the pressure of the pneumatic pressure sealing member is increased, the pneumatic pressure sealing member is prevented from being deformed in excess of a normal level, and the pressure is transmitted to the movable member through the pneumatic pressure sealing member.

5 Claims, 3 Drawing Sheets

ELASTIC BODY APPARATUS ESPECIALLY INTENDED FOR AN ANTI-LOCK BRAKE SYSTEM

BACKGROUND OF THE INVENTION

1. Field of the Invention

The present invention relates to an improved elastic body apparatus. More particularly, it relates to an elastic body apparatus used, e.g., in the suspension system for an automobile, or a liquid pressure regulator for an anti-lock brake thereof, etc.

2. Description of the Prior Art

Liquid pressure control devices for anti-lock brakes are well known in the art. See, for example, U.S. Pat. No. 4,600,245 and Canadian Patent No. 1,256,966.

As the elastic body apparatus used for a suspension system or the like for automobiles, various devices have been heretofore known which use a spring force of compressed air sealed by a flexible member. However, the prior art as noted above has problems. For example, in the case where a set load of the spring force is increased, if the effective pressure receiving area is increased, miniaturization thereof cannot be attained. In addition, if a pressure-resisting strength of a flexible member is increased so that a high pressure of compressed air may be used, it becomes difficult to obtain a suitable flexibility.

FIG. 4 shows an elastic body apparatus which uses both a pneumatic spring and a coil spring in order to obtain a great spring force in a small-sized device, the apparatus being applied to a liquid pressure regulator or control device for an anti-lock brake.

A master cylinder 2 actuated by application of a brake pedal 1 is connected to an end brake 6 via a liquid pressure regulator 5 by brake tubes 3 and 4. The liquid pressure regulator 5 houses a movable liquid pressure regulating piston 7 and a pressure differential responsive piston 8 formed integral therewith. The liquid pressure regulating piston 7 is slidably received within a small diameter cylinder 9 and the pressure differential responsive piston 8 is slidably received within a large diameter cylinder 10. Pistons 7 and 8 are provided with annular seals 11, 12 and 13, 14, respectively.

A lid member 15 is secured at the upper portion of the liquid pressure regulator 5, and a pneumatic pressure chamber 16 is formed between the lid member 15 and the pressure differential responsive piston 8. Gas having a predetermined pressure is sealed into the pneumatic pressure chamber 16, and a coil spring 17 is also inserted compressible with a predetermined mounting load. The pneumatic pressure chamber 16 and the coil spring 17 constitute an elastic body apparatus which downwardly urges the pressure differential responsive piston 8 (a movable member) and the liquid pressure regulating piston 7.

At the lower portion of the liquid pressure regulator 5 are provided an input hole or inlet 18, a valve chamber 19, a liquid pressure regulating chamber 20 and an output hole or outlet 21, the input hole 18 and the output hole 21 being connected to the brake tube 3 and the brake tube 4, respectively. An opening and closing valve 22 is mounted between the valve chamber 19 and the liquid pressure regulating chamber 20, the valve 22 being opened, in a normal state, by being pushed down by a pin 23 secured to the lower end of the liquid pressure regulating piston 7. A spring 24 serves to urge or bias valve 22 in a direction toward its "closed" position.

An annular liquid pressure chamber 25 is formed below the pressure differential responsive piston 8, the chamber 25 being connected to an electromagnetic valve means 27 by means of a liquid pressure tube 26. The electromagnetic valve means 27 is turned ON and OFF by an electronic control unit (not illustrated). An inlet side of the electromagnetic valve means 27 is connected to a discharge side of a pump 29 through a supply pipe 28, and a release side thereof is connected to a liquid tank 31 of the pump 29 through a conduit 30.

In the vehicle being operated, when the brake pedal is stepped on or depressed by the driver, the brake liquid pressure produced in the master cylinder 2 is supplied to the end brake 6 via the brake tube 3, the input hole 18, the valve chamber 19, the liquid pressure regulating chamber 20, the output hole 21 and the brake tube 4 to effect braking operation. However, when the aforesaid brake liquid pressure is excessively supplied with respect to a proper friction between the tires and the road surface and the wheels tend to lock, the electromagnetic valve means 27 is turned ON by the ON-signal of the electronic control unit (not shown), and the liquid pressure of the pump 29 is supplied to the liquid pressure chamber 25.

When the pressure differential responsive piston 8 is moved upward, due to the liquid pressure supplied to the liquid pressure chamber 25, against the pressure of the pneumatic pressure chamber 16 and the spring force of the coil spring 17, the internal volume of the liquid pressure regulating chamber 20 is enlarged and, at the same time, the valve 22 is closed. As a result, the excessive supply from the master cylinder 2 to the end brake 6 is cut off, the brake liquid pressure of the end brake 6 is reduced, and the locking of the brake is avoided. When the electromagnetic valve means 27 is turned OFF by the OFF-signal of the electronic control unit, the supply of liquid pressure from the pump 29 is cut off. When the liquid pressure of the liquid pressure chamber 25 is released to the liquid tank 31, the pressure differential responsive piston 8 and the liquid pressure regulating piston 7 are moved downward by the pressure of the pneumatic pressure chamber 16 and the spring force of the coil spring 17. The brake liquid pressure of the end brake 6 is increased by the compression of the liquid pressure regulating chamber 20.

However, the prior art as described above has problems. Corrosion on the inner wall surfaces of the large diameter cylinder 10 can build up over time. Scratches caused by upward and downward movement of the pressure differential responsive piston 8 also occur on the inner wall surfaces of the large diameter cylinder 10. In addition, dust or the like may enter between the seals 13, 14 and the inner wall sliding surface to impair sealing properties of the pneumatic pressure chamber 16. As a result, the pressure of the pneumatic chamber 16 is lost to vary the spring force, and when the air pressure sealed is set to a large value, the sliding resistance of the seal 14 increases to impair the quick-responsiveness of the pressure differential responsive piston 8. Moreover, when the mounting load of the coil spring 17 is increased, the apparatus become difficult to be miniaturized.

SUMMARY OF THE INVENTION

It is an object of the present invention to provide an elastic body apparatus, which is small in size, affords a large spring force, provides excellent sealing properties and durability of a pneumatic pressure chamber and maintains a quick-responsiveness of the movable member.

It is a further object of the present invention to provide such an elastic body which is especially useful as a control device for an anti-lock brake system.

These and other related objects are achieved according to the present invention by the provision of an elastic body apparatus which comprises a pneumatic pressure sealing member formed of a hollow flexible material and sealing therein a high pneumatic gas, a movable member driven by the force applied from outside against the pressure of said pneumatic pressure sealing member, a fixed shell enveloping a fixed portion of said pneumatic pressure sealing member, and an elastic shell having a plate spring portion for applying a spring force in the same direction as the urging direction of said pneumatic pressure sealing member to said movable member and disposed at a position enveloping a displaced portion of said pneumatic pressure sealing member. As a result, the elastic shell serves as the shell and the spring body, and even if the pneumatic pressure of the pneumatic pressure sealing member is increased, a deformation of the pneumatic pressure sealing member in excess of a normal state may be prevented to transmit a pneumatic pressure to the movable member via the pneumatic pressure sealing member.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
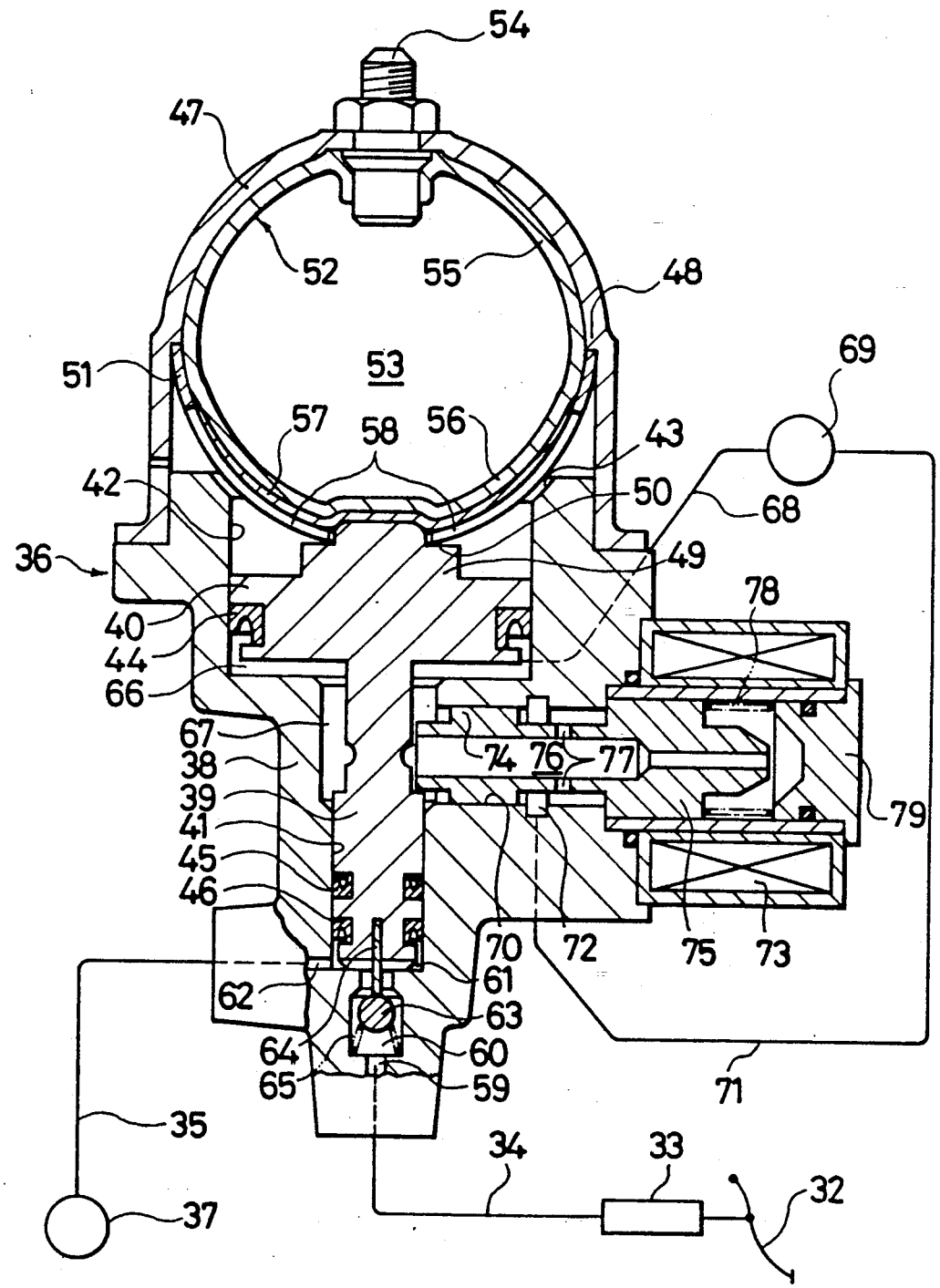
FIG. 1 is a sectional view showing one embodiment of the present invention.

Referring now to the drawings, FIG. 1 illustrates one embodiment of the present invention applied to a liquid pressure regulator for an anti-lock brake used in automobiles and other vehicles. A master cylinder 33 actuated by application of a brake pedal 32 is connected to an end brake 37 via a liquid pressure regulator or control device 36 by brake tubes 34 and 35.

A liquid pressure regulating piston 39 and a pressure differential responsive piston 40 (corresponding to a movable member of the present invention) formed integral therewith are received within a housing or body 38 of the liquid pressure regulator 36 for vertical reciprocable movement therein. Housing 38 includes an upwardly opened, relatively small diameter cylinder 41 with which liquid pressure regulating piston 39 slidably contacts and an upwardly opened, relatively large diameter cylinder 42 with which pressure differential responsive piston 40 slidably contacts. Pistons 39, 40 are provided with annular seals 45, 46 and 44, respectively.

The upper end of cylinder 42 is provided with an opening 43.

An inverted bowl-like fixed shell 47 covering the opening 43 is fixedly mounted above housing 38. Fixed shell 47 is provided with an internal annular shoulder 48. Pressure differential piston 40 is provided at its top end with a shoulder 49 having an abutment surface 50. An inwardly compressible elastic shell 51 is disposed between shoulder 48 and abutment surface 50 (which will be described later with reference to FIGS. 2 and 3), which is approximately semi-spherical in shape and is employed to bias or urge the pressure differential responsive piston 40 in a downward direction.

Fixed shell 47 and elastic shell 51 surround a rubber, spherical hollow pneumatic sealed pressure sealing member 52 having a pneumatic pressure chamber 53 filled with compressed air having a predetermined pressure via plug 54. Pneumatic pressure sealing member 52 has a fixed portion 55 pressing against the inner surface of fixed shell 52 as a result of the pressure generated by the compressed air and a displacing portion 56 pressing against the elastic shell 51 which becomes deformed when the elastic shell 51 is compressed. A sheet member 57 made of a synthetic resin is inserted between the displacing portion 56 and the elastic shell 51. The displacing portion 56 is protected by the sheet member 57 from being partly abnormally deformed and inflated in the region of a slit portion 58 formed in the elastic shell 51. At the same time, the compressed air pressure of the pneumatic pressure chamber 53 is transmitted to the abutment surface 50 through the displacing portion 56, the sheet member 57 and the elastic shell 51. The aforementioned fixed shell 47, elastic shell 51, pneumatic pressure sealing member 52 and sheet member 57 constitute an elastic body apparatus. This elastic body apparatus is sufficiently strong with respect to the compressed air pressure to prevent the pneumatic pressure sealing member 52 from being deformed in excess of a normal lever. The pressure differential responsive piston 40 is urged downward by the pressure generated by the compressed air sealed within pneumatic pressure chamber 53 and the high spring force of the elastic shell 51.

An input hole 59, a valve chamber 60, a liquid pressure regulating chamber 61 and an output hole 62 are provided at the lower end of housing 38, input hole 59 and output hole 62 being connected to the brake tube 34 and the brake tube 35, respectively. An opening and closing valve 63 is mounted between valve chamber 60 and liquid pressure regulating chamber 61, and normally disposed in an open position by being biased downwardly by a pin 64 fixed to the lower end of the liquid pressure regulating piston 39. A spring 65 is disposed in valve chamber 61 for urging the valve 63 upwardly toward its closed position.

Continuous liquid pressure chambers 66 and 67 are formed below the pressure differential responsive piston 40 between large diameter cylinder 42 and small diameter cylinder 41. Liquid pressure chamber 66 is connected to a discharge side of a pump 69 by means of a liquid pressure pipe 68.

A valve cylinder 70 disposed perpendicular to the liquid pressure chamber 67 is provided on the right-hand side of the housing 38, and an annular, liquid pressure releasing groove 72 connected to a suction side of pump 69 through a conduit 71 is formed in the valve cylinder 70. A solenoid coil 73 coaxial with valve cylinder 70 is mounted on the right-hand side of valve cylinder 70. A spool valve 74 and a movable core 75 formed integral therewith are laterally movably inserted into valve cylinder 70 and the solenoid coil 73. Spool valve 74 and movable core 75 are provided with liquid passages 76 and 77. When spool valve 74 is at a return position (as shown), liquid pressure chamber 67 is released through liquid passages 76, 77, the liquid pressure releasing groove 72 and the conduit 71. A spring 78 serves to bias the movable core 75 to the return position (as shown). A stroke end member 79 is secured to the solenoid coil 73.

Figure 2:
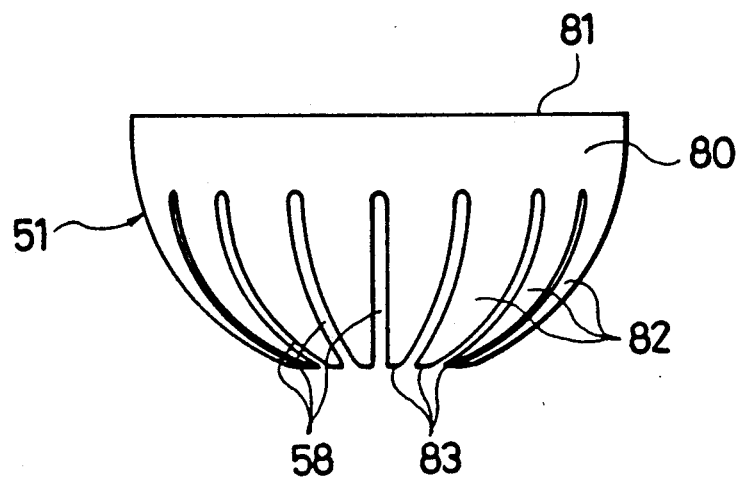
FIG. 2 is a side elevational view showing an elastic shell of the embodiment shown in FIG. 1.
Figure 3:
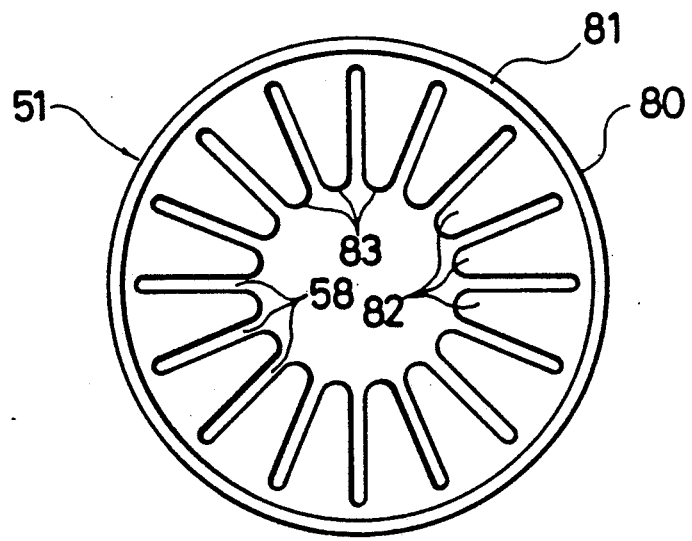
FIG. 3 is a plan view likewise showing an elastic shell of the embodiment shown in FIG. 1.
Figure 4:
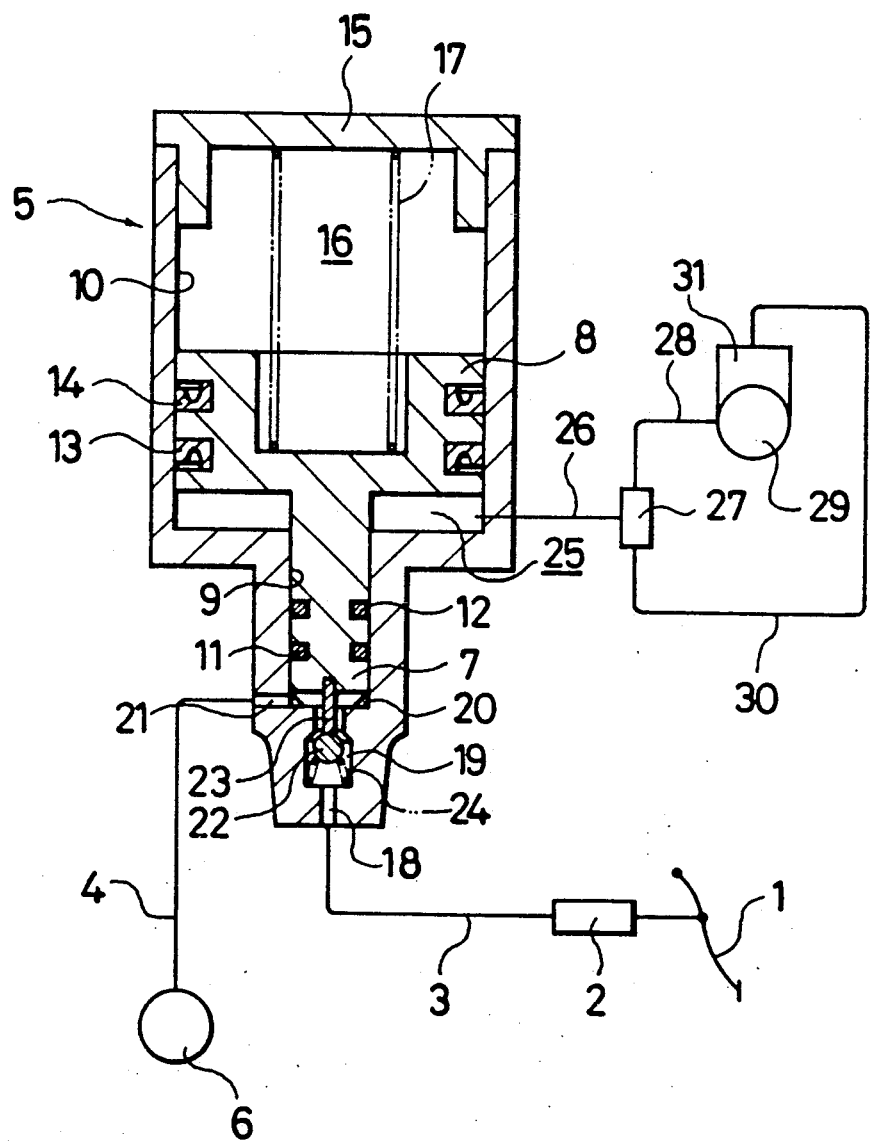
FIG. 4 is a sectional view showing a conventional elastic body apparatus applied to a liquid pressure regulator for an anti-lock brake.

As seen best in FIGS. 2 and 3, upper edge of the generally semi-spherical shell 51 is provided with a contact surface 81 which is intended to press against shoulder 48 of fixed shell 47 (as shown in FIG. 1). Elastic shell 51 has plate spring portions 82 formed therein between radially-extending slit portions 58. Each of the plate spring portions 82 is formed at its lower extended end with a contact end 83 which presses against the abutment surface 50 of the pressure differential responsive piston 40.

The operation will now be described with reference to FIGS. 1 to 3. When the brake pedal 32 is not operated, the pressure differential responsive piston 40 is urged downward by the air pressure generated by the compressed air sealed within pneumatic pressure sealing member 52 and the spring force of the elastic shell 51. Valve 63 is opened by being pushed down by the pin 64 secured to the liquid pressure regulating piston 39 at the return position shown in FIG. 1.

When brake pedal 32 is operated by the driver in the vehicle being operated, the brake liquid pressure produced in master cylinder 33 is supplied to end brake 37 via brake tube 34, input hole 59, valve chamber 60, liquid pressure regulating chamber 61, output hole 64 and brake tube 35, whereby the braking operation is effected. During the braking operation, the liquid pressure regulating piston 39 tends to be forced upward by an increase in liquid pressure of the liquid pressure regulating chamber 61. However, since the air pressure in pneumatic chamber 53 and the spring force of elastic shell 51 are set to be larger than the maximum value of the aforesaid "forcing-up" force, pressure differential responsive piston 40 and liquid pressure regulating piston 39 are not moved upward, and valve 63 also remains opened.

When the liquid pressure from master cylinder 33 to the end brake 37 is supplied excessively with respect to a proper frictional force between the tire and the road, a pump drive signal is provided from the electronic control unit (not shown) by deceleration information of the wheel. When pump 69 is driven, the liquid discharged from pump 59 is circulated via liquid pressure pipe 68, liquid pressure chambers 66, 67, liquid passages 76, 77, liquid pressure release groove 72 and conduit 71. When the wheel is about to lock-up, the solenoid coil 73 is energized by the reduction signal (ON signal) provided from the electronic control unit whereby the movable core 75 and the spool valve 74 are moved till they contact the stroke end member 79 against the action of spring 78.

When liquid pressure release groove 72 is closed by the aforesaid movement of spool valve 74, the circulation of liquid is cut off, the liquid pressures of liquid pressure chambers 66 and 67 are increased by the discharge force of pump 69, and the pressure differential responsive piston 40 and the liquid pressure regulating piston 39 are moved upward from the FIG. 1 position against the action of the force generated by the air pressure within pneumatic chamber 53 and the spring force of elastic shell 51. Simultaneously when the inner volume of liquid pressure regulating chamber 61 is enlarged by the aforesaid upward movement, valve 63 which is effectively "released" from being pushed down by pin 64 is closed by the action of spring 65. Accordingly, the excessive supply from master cylinder 33 to end brake 37 is cut off, the brake liquid pressure of end brake 37 is reduced, and the locking of the brake of the wheel is avoided.

When a pressure-increase signal (OFF signal) is provided from the electronic control unit, solenoid coil 73 is deenergized, and movable core 75 and spool valve 74 are moved leftward (FIG. 1) under the force of spring 78. Then, liquid pressure release groove 72 is opened whereby the liquid pressures of liquid pressure chambers 66, 67 are released, and the circulation of the liquid is restored. Even when the liquid is circulated by the drive of pump 69 or even when the drive of pump 69 is stopped by a stop signal from the electronic control unit, where the liquid pressure release groove 72 is opened by the spool valve 74, the liquid pressure for moving upward the pressure differential responsive piston 40 against the air pressure and the spring force of the elastic shell 51 is not produced in the liquid pressure chambers 66, 67 but the liquid pressure regulating chamber 61 is compressed by the spring force. Thereby, when the brake liquid pressure of the end brake 37 is increased, the braking operation restarts.

In the upward- and downward movement of the pressure differential responsive piston 40 as described above, an extremely quick responsiveness is required. However, even if a seal normally used for establishing a high pneumatic pressure (which increases the sliding resistance) is not used, a high compressed air pressure can be obtained or sealed within pneumatic chamber 53. Therefore, the apparatus can be miniaturized, and in addition, the moving speed of the pressure differential responsive piston 40 can be increased.

Various modifications of the invention may be made as will be apparent to one skilled in the art. For example, the sheet member 57 can be omitted if safeguards are taken to prevent the pneumatic pressure sealing member 52 from being cut or bitten into it. This can be accomplished by making smaller the width of the slit portion 58 of the elastic shell 51 or by forming the pneumatic pressure sealing member 52 into a thicker-walled member. While the plate spring portions 82 have been shown as extending from the upper edge portion 80 downward axially of the elastic shell 51, it is to be noted that they may be radially extended in upper edge portion 80 toward the contact surface 81 in which case the upper edge 80 may be divided by the slit portions 58. The shape of the fixed shell 47 and the elastic shell 51 is not limited to those of the embodiments shown in FIGS. 1 to 3, but a cylindrical shape and a truncated conical shape, for example, may be used.

Thus, while only one embodiment of the present invention has been shown and described, it is obvious that many changes and modifications may be made thereunto without departing from the spirit and scope of the invention.

What is claimed is:
1. An elastic body apparatus comprising:
 a hollow, flexible, pneumatic pressure sealing member having a pressure-sealed gas chamber for containing a pressurized gas which, in turn, causes said pneumatic pressure sealing member to generate a pressure in a pressing direction, said sealing member defining a fixed portion and a displacing portion;

a movable member to which an external force may be applied to cause it to act against the pressure of said pneumatic pressure sealing member;

a fixed shell enveloping said fixed portion of said pneumatic pressure sealing member; and an elastic shell having plate spring portions for applying a spring force in the same direction as the pressing direction of said pneumatic pressure sealing member to said movable member, and disposed at a position enveloping said displacing portion of said pneumatic pressure sealing member.

2. The elastic body apparatus according to claim 1, wherein a sheet member for protecting said pneumatic pressure sealing member from the plate spring portions of said elastic shell is provided between said pneumatic pressure sealing member and said elastic shell.

3. The elastic body apparatus according to claim 1, wherein said pneumatic pressure sealing member is generally spherical, said fixed shell is in the form of an inverted bowl, and said elastic shell is semi-spherical.

4. The elastic body apparatus according to claim 3, wherein a plurality of slit portions are radially cut into said semi-spherical elastic shell to thereby form a plurality of said plate spring portions.

5. The elastic body apparatus according to claim 1, wherein said movable member is a pressure differential piston of an anti-lock brake assembly.

* * * * *